US012546788B2

(12) United States Patent
Tanaka et al.

(10) Patent No.: US 12,546,788 B2
(45) Date of Patent: Feb. 10, 2026

(54) METHODS FOR DIFFERENTIATING DESTRUCTIVE THYROIDITIS FROM OTHER PATHOLOGICAL CONDITIONS

(71) Applicant: ASKA PHARMACEUTICAL CO., LTD., Tokyo (JP)

(72) Inventors: Yuji Tanaka, Tokyo (JP); Yosuke Ono, Tokyo (JP); Naoya Fujita, Tokyo (JP)

(73) Assignee: ASKA PHARMACEUTICAL CO., LTD., Tokyo (JP)

( * ) Notice: Subject to any disclaimer, the term of this patent is extended or adjusted under 35 U.S.C. 154(b) by 693 days.

(21) Appl. No.: 17/995,181

(22) PCT Filed: Mar. 31, 2021

(86) PCT No.: PCT/JP2021/013861
§ 371 (c)(1),
(2) Date: Sep. 30, 2022

(87) PCT Pub. No.: WO2021/201111
PCT Pub. Date: Oct. 7, 2021

(65) Prior Publication Data
US 2023/0168257 A1    Jun. 1, 2023

(30) Foreign Application Priority Data
Apr. 1, 2020  (JP) ................. 2020-065886

(51) Int. Cl.
*G01N 21/64*   (2006.01)
*C07F 5/02*    (2006.01)
*C09B 57/00*   (2006.01)
*C09K 11/06*   (2006.01)
*G01N 33/68*   (2006.01)

(52) U.S. Cl.
CPC ... *G01N 33/6893* (2013.01); *G01N 2800/046* (2013.01)

(58) Field of Classification Search
CPC .......... G01N 33/6893; G01N 2800/046; G01N 33/6812; G01N 33/487; G01N 2030/027
See application file for complete search history.

(56) References Cited

U.S. PATENT DOCUMENTS

2012/0053073 A1* 3/2012 Kassis ..................... A61P 25/00
                                                   435/7.92
2012/0149036 A1* 6/2012 Araki .................. G01N 33/5091
                                                   435/325
2019/0369113 A1* 12/2019 Shuford ............. G01N 33/6851

FOREIGN PATENT DOCUMENTS

JP    H07116031 B2    12/1995
JP    2013538565 A    10/2013

OTHER PUBLICATIONS

Rolland, Marcel, Robert Aquaron, and Serge Lissitzky. "Thyroglobulin iodoamino acids estimation after digestion with pronase and leucylaminopeptidase." Analytical Biochemistry 33.2 (1970): 307-317. (Year: 1970).*

(Continued)

*Primary Examiner* — Jennifer Wecker
*Assistant Examiner* — Oyeleye Alexander Alabi
(74) *Attorney, Agent, or Firm* — BUCHANAN INGERSOLL & ROONEY PC

(57) ABSTRACT

Described is a method for differentiating destructive thyroiditis, including measuring at least one of monoiodotyrosine and diiodotyrosine in a sample.

16 Claims, 11 Drawing Sheets

Control: Patients with physical and data abnormalities suspected for thyroid disease at the physician's examination and TSH and FT4 levels within reference values despite TSH/FT4 being measured DT: Patients diagnosed with destructive thyroiditis (DT) (1 subacute, 2 painless)

GD: Patients diagnosed with Graves' disease (GD)

GTH: Patients with gestational transient hyperthyroidism

(56) References Cited

OTHER PUBLICATIONS

Ikeda, "25. Hyperthyroidism and hypothyroidism", Guidelines for Clinical Laboratory Tests by Diagnostic Group 2003—Toward Standardization of Medical Care, Japanese Society of Laboratory Medicine, ed., 2003, pp. 107-110.

International Search Report (PCT/ISA/210) with English translation and Written Opinion (PCT/ISA/237) mailed on Jun. 22, 2021, by the Japanese Patent Office as the International Searching Authority for International Application No. PCT/JP2021/013861.

Nakano, et al., "Rapid Differential Diagnosis of Graves' Disease and Destractive Thyroiditis in Untreated Patients with Thyrotoxicosis", Dokkyo Journal of Medical Sciences, 36(2), 2009, pp. 105-108.

Fujita, Naoya: "The utility of measuring monoiodotyrosine (MIT) and diiodotyrosine (DIT) in differentiating between Basedow's disease and destructive thyroiditis, and examination on the distribution of measured values in a person with normal thyroid hormone levels", National Defense Medical College, Mar. 26, 2022 (approved date), https://www.ndmc.ac.jp/wp-content/uploads/2020/05/4111.pdf. (2 pages).

Notice of Reasons for Refusal issued Apr. 26, 2022, in counterpart Japanese Patent Application No. 2022-509721 (Now Japanese Patent No. 7135238) and a machine English translation of the Notice.

Yoshida, et al., "Diagnosis of subacute thyroiditis and painless thyroiditis", Journal of the Japanese Society of Internal Medicine, vol. 86, No. 7, Jul. 10, 1997, pp. 48-53.

Yoshimura, "Approach to thyroid hormone abnormalities", Journal of the Japanese Society of Internal Medicine, vol. 103, No. 4, Apr. 10, 2014, pp. 855-861.

Rolland, M., et al., "Iodoamino acid composition of the thyroglobulin of normal and diseased thyroid glands comparison with in vitro iodinated thyroglobulin", Clinica Chimica Acta, Elsevier BV, Amsterdam, NL, vol. 39, No. 1, Jun. 1, 1972, pp. 95-108.

Thomas, W. C., et al., "Clinical Studies in Thyroiditis", Annals of Internal Medicine, vol. 63, No. 5, Nov. 1, 1965, pp. 808-818, URL: https://dx.doi.org/10.7326/0003-4819-63-5-808.

Izumi, Yukiko, et al., "Simple and practical parameters for differentiation between destruction-induced thyrotoxicosis and Graves' thyrotoxicosis—Izumi—2002—Clinical Endocrinology—Wiley Online Library", Clin Endocrinol (Oxf), Jul. 5, 2002, vol. 57, Issue 1, pp. 51-58, Jan. 1, 2002, URL: https://onlinelibrary.wiley.com/doi/10.1046/j.1365-2265.2002.01558.x.

Brent, Gregory A. et al., "Hypothyroidism and Thyroiditis", Williams Textbook of Endocrinology, Elsevier, Jan. 1, 2016, Chapter 13, pp. 416-448.

Extended European Search Report issued on Mar. 6, 2024, by the European Patent Office in corresponding European Application No. 21778707.6 (12 pages).

\* cited by examiner

Fig. 1

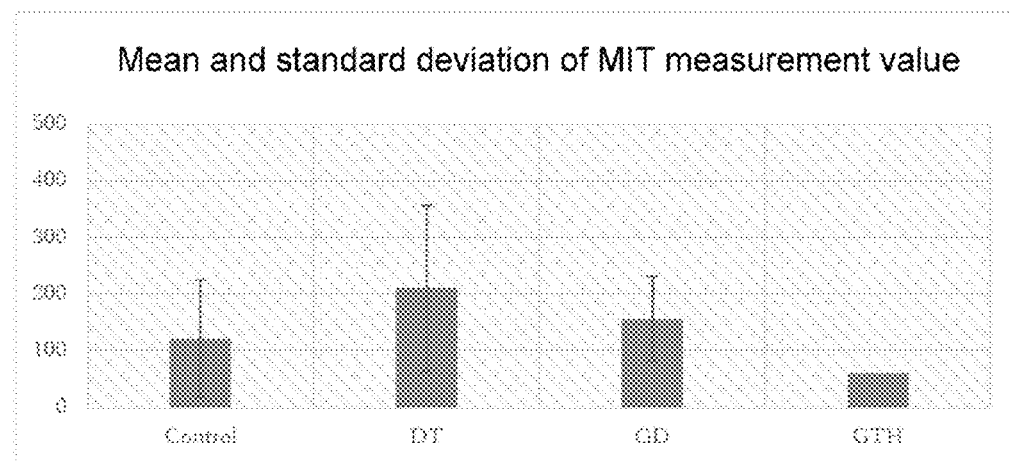

Control: Patients with physical and data abnormalities suspected for thyroid disease at the physician's examination and TSH and FT4 levels within reference values despite TSH/FT4 being measured DT: Patients diagnosed with destructive thyroiditis (DT) (1 subacute, 2 painless)

GD: Patients diagnosed with Graves' disease (GD)

GTH: Patients with gestational transient hyperthyroidism

Fig. 2

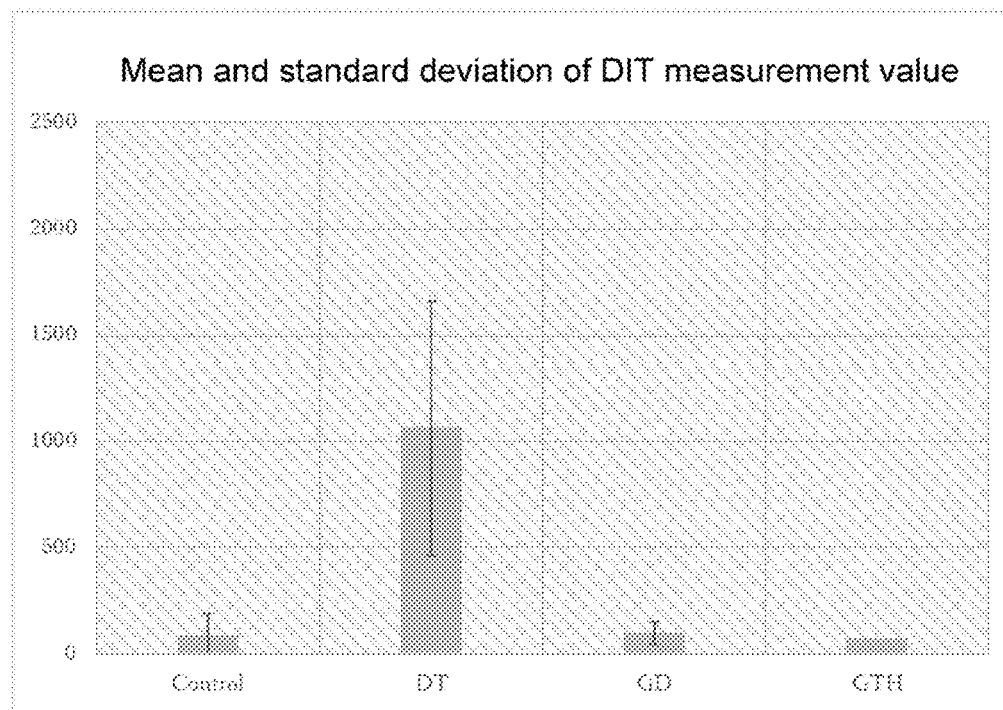

Control: Patients with physical and data abnormalities suspected for thyroid disease at the physician's examination and TSH and FT4 levels within reference values despite TSH/FT4 being measured DT: Patients diagnosed with destructive thyroiditis (DT) (1 subacute, 2 painless)

GD: Patients diagnosed with Graves' disease (GD)

GTH: Patients with gestational transient hyperthyroidism

Control: Patients with physical and data abnormalities suspected for thyroid disease at the physician's examination and with thyroids having TSH and FT4 levels within reference values despite TSH/FT4 being measured DT: Patients diagnosed with destructive thyroiditis (DT)

GD: Patients diagnosed with Graves' disease (GD)

Control: Patients with physical and data abnormalities suspected for thyroid disease at the physician's examination and with thyroids having TSH and FT4 levels within reference values despite TSH/FT4 being measured DT: Patients diagnosed with destructive thyroiditis (DT)

GD: Patients diagnosed with Graves' disease (GD)

Control: Patients with physical and data abnormalities suspected for thyroid disease at the physician's examination and with thyroids having TSH and FT4 levels within reference values despite TSH/FT4 being measured DT: Patients diagnosed with destructive thyroiditis (DT)

GD: Patients diagnosed with Graves' disease (GD)

Control: Patients with physical and data abnormalities suspected for thyroid disease at the physician's examination and with thyroids having TSH and FT4 levels within reference values despite TSH/FT4 being measured DT: Patients diagnosed with destructive thyroiditis (DT)

GD: Patients diagnosed with Graves' disease (GD)

Fig. 7

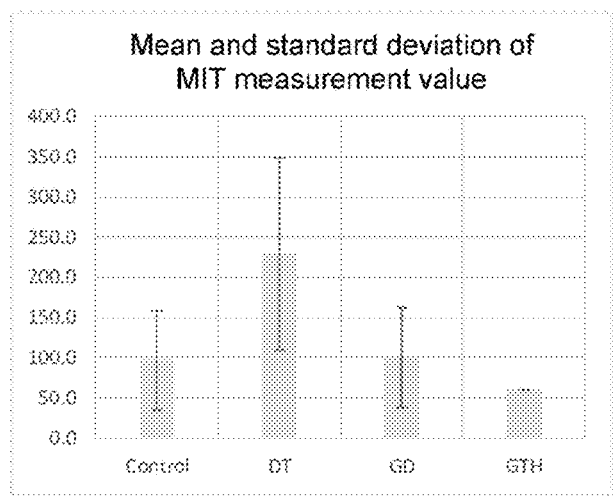

Control: Patients with physical and data abnormalities suspected for thyroid disease at the physician's examination and with thyroids having TSH and FT 4 levels within reference values despite TSH/FT 4 being measured DT: Patients diagnosed with destructive thyroiditis (DT)

GD: Patients diagnosed with Graves' disease (GD)

GTH: Patients with gestational transient hyperthyroidism

Fig. 8

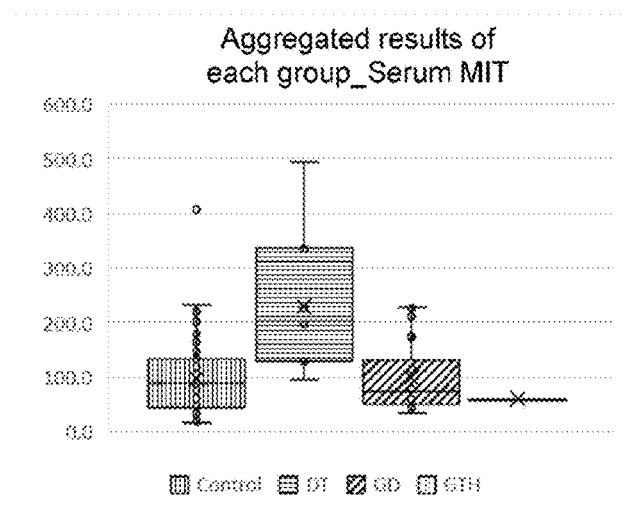

Control: Patients with physical and data abnormalities suspected for thyroid disease at the physician's examination and with thyroids having TSH and FT 4 levels within reference values despite TSH/FT 4 being measured DT: Patients diagnosed with destructive thyroiditis (DT)

GD: Patients diagnosed with Graves' disease (GD)

GTH: Patients with gestational transient hyperthyroidism

Fig. 9

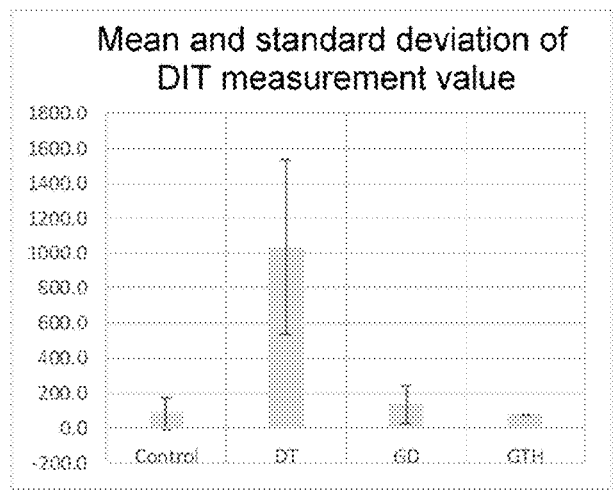

Control: Patients with physical and data abnormalities suspected for thyroid disease at the physician's examination and with thyroids having TSH and FT 4 levels within reference values despite TSH/FT 4 being measured DT: Patients diagnosed with destructive thyroiditis (DT)

GD: Patients diagnosed with Graves' disease (GD)

GTH: Patients with gestational transient hyperthyroidism

Fig. 10

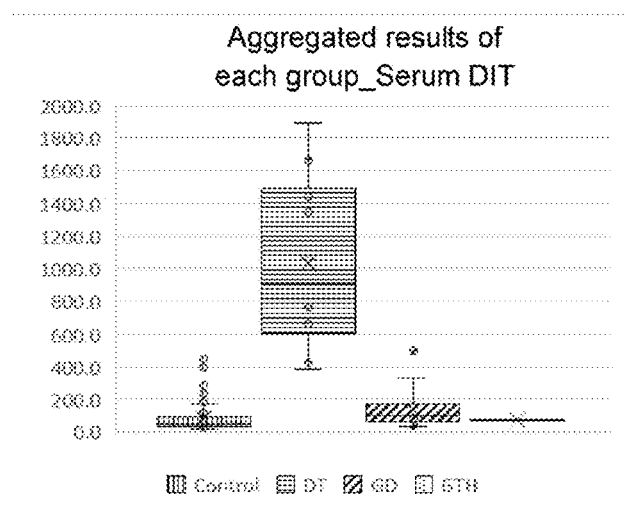

Control: Patients with physical and data abnormalities suspected for thyroid disease at the physician's examination and with thyroids having TSH and FT 4 levels within reference values despite TSH/FT 4 being measured DT: Patients diagnosed with destructive thyroiditis (DT)

GD: Patients diagnosed with Graves' disease (GD)

GTH: Patients with gestational transient hyperthyroidism

METHODS FOR DIFFERENTIATING DESTRUCTIVE THYROIDITIS FROM OTHER PATHOLOGICAL CONDITIONS

TECHNICAL FIELD

The present invention relates to a method for differentiating destructive thyroiditis based on the amount of monoiodotyrosine (MIT) and/or diiodotyrosine (DIT) present outside the thyroid gland, such as in blood.

BACKGROUND ART

The thyroid gland is an endocrine organ that produces thyroid hormones from iodine contained in food and secretes them into the blood. There are two types of endocrine cells in the thyroid gland, the majority of which are follicular cells. In the follicular cavity of the follicular cells, tyrosine residues undergo iodination in the presence of hydrogen peroxide. During the organification process of iodine, iodine is bound to the carbons at positions 3 and 5 of the tyrosine residue of thyroglobulin (Tg) to produce monoiodotyrosine (MIT) and diiodotyrosine (DIT) which are the precursors of thyroid hormones. Next, MIT and DIT are polymerized by peroxidase to generate the thyroid hormone triiodothyronine (T3), and DIT and DIT are polymerized to generate thyroxine (T4). In follicular cells, iodinated Tg releases T3, T4, MIT and DIT by the work of proteolytic enzymes. T3 and T4 are then secreted into the blood, and from MIT and DIT, iodine ions are released due to the action of deiodinase and reused. A majority of thyroid hormones secreted into the blood from the thyroid gland exist as a form bound to proteins in blood. However, it is the free T3 (FT3) and free T4 (FT4) unbound to proteins, which are effective. The main role of thyroid hormones is mostly life-support-related and widely extends to effects on the heart and skeletal muscle, metabolism-related, the nervous system, and development.

Destructive thyroiditis is a disease in which the destruction of thyroid follicles occurs due to stress from such as childbirth and surgery, some drugs, or food, etc., causing thyroid hormone leakage into the blood, which results in symptoms of thyrotoxicosis such as heart palpitations, weight loss, and excessive sweating. Destructive thyroiditis can be subacute thyroiditis with pain or painless thyroiditis without pain. Destructive thyroiditis differs from Graves' disease in that the excessive thyroid hormone state is temporary and while the destroyed thyroid gland is recovering, hormone levels may drop and the patient may develop hypothyroidism, but the patient will recover within a few months.

In the case of subacute thyroiditis, when the affected area is unilateral and mildly painful, it is important to differentiate it from undifferentiated thyroid cancer or intracystic hemorrhage, while in the case of painless thyroiditis, it is important to differentiate it from Graves' disease. In destructive thyroiditis, spontaneous curing is common; in severe cases, corticosteroids may be administered for subacute thyroiditis and beta-blockers may be administered for painless thyroiditis. The differentiation from Graves' disease is particularly important. If a patient with painless thyroiditis is administered with a therapeutic drug for Graves' disease, not only that the patient may be prone to hypothyroidism, but the side effects of the therapeutic drug for Graves' disease (especially agranulocytosis), when present, may become a serious issue.

The methods for differentiation between destructive thyroiditis and Graves' disease are generally performed in that when a patient's FT3 and FT4 levels are high and thyroid-stimulating hormone (TSH) is 0.1 µIU/mL or less, anti-TSH receptor antibody (TRAb) is further measured, and if the result is positive, it is diagnosed as Graves' disease, and if the result is negative, it is diagnosed as destructive thyroiditis. TRAb measurement is performed using a kit, but the nature and method of measurement remain problematic because the antibody measured as TRAb is not necessarily a single antibody, and in case of idiopathic myxoedema, for example, the results also demonstrate high levels. TRAb can also be rarely positive in painless thyroiditis and subacute thyroiditis (Non-Patent Literatures 1 to 4).

Other methods of differentiating destructive thyroiditis from Graves' disease include the followings:

(i) FT3/FT4 Ratio

A similarly elevated FT3/FT4 ratio indicates painless thyroiditis, and an FT3/FT4 ratio of 2.5 or more indicates Graves' disease. However, the sensitivity and specificity are low.

(ii) Blood Flow Index or Blood Flow Density

A decreased blood flow on thyroid ultrasound test indicates painless thyroiditis, while an increased blood flow indicates Graves' disease.

(iii) Inferior Thyroid Artery-Blood Flow Velocity

Normal to low value of velocity indicates painless thyroiditis and normal to abnormally high value of velocity indicates Graves' disease. However, the value may be low in Graves' disease and high in painless thyroiditis.

(iv) $^{123}$I or $^{99m}$Tc Scintigraphy (Intake Rate)

Decreased uptake of $^{123}$I or $^{99m}$Tc (taken up by the same mechanism as iodine) indicates painless thyroiditis and an increase from normal level indicates Graves' disease. $^{99m}$Tc is a radioisotope prepared at the time of use, and the test cannot be canceled, and the differentiation is often completed by the time it is made. On the other hand, $^{99m}$Tc has the advantage in that there are no restrictions on iodine uptake, but high iodine uptake impedes the distinction.

(v) Urinary Iodine Discharge Measurement

If urinary total iodine discharge increases, the patient is believed to have painless thyroiditis; if not, the patient is believed to have Graves' disease. However, the timing of measurement is limited because of the effect of diet.

Thus, although various differentiation methods have been developed for destructive thyroiditis, there is no convenient and accurate way to differentiate it from others.

On the other hand, MIT, as mentioned above, is a precursor of thyroid hormone, a substance in which iodine is coordinated to the meta-position of the phenol ring of tyrosine. The two molecules are bound together to form 3,3'-diiodothyronine. Moreover, one additional molecule in the thyroid colloids is bound to diiodotyrosine to form triiodothyronine.

Furthermore, DIT, as mentioned above, is a precursor of thyroid hormone, a substance in which iodine is coordinated to the other meta-position of the phenol ring of monoiodotyrosine. Diiodotyrosine modulates the function of iodide peroxidase. It also binds to monoiodotyrosine in thyroid colloids to form triiodothyronine. When two molecules of diiodotyrosine are bound together, thyroxine is formed.

Although MIT and DIT were known to have applications as anti-cancer agents (see Patent Literature 1), they were not known to be released into the blood after the thyroid gland was destroyed.

CITATION LIST

Patent Literatures

Patent Literature 1: JP H07-116031 B

Non-Patent Literatures

Non-patent Literature 1: Hitoshi Ikeda: "25. Hyperthyroidism and hypothyroidism", "Guidelines for Clinical Laboratory Tests by Diagnostic Group 2003—Toward Standardization of Medical Care-" Japanese Society of Laboratory Medicine, ed. 107-110, 2003

Non-patent Literature 2: Yoshimura H: Approach to thyroid hormone abnormalities, Journal of the Japanese Society of Internal Medicine, Vol. 103, No. 4 (Apr. 10, 2014): 855-861

Non-patent Literature 3: Katsumi Yoshida, et al: Diagnosis of subacute thyroiditis and painless thyroiditis, Journal of the Japanese Society of Internal Medicine, Vol. 86, No. 7 (Jul. 10, 1997):48-53

Non-patent Literature 4: Ayuko Nakano, et al: Rapid Differential Diagnosis of Graves' Disease and Destractive Thyroiditis in Untreated Patients with Thyrotoxicosis, Dokkyo Journal of Medical Sciences, 36(2), 105-108, 2009

SUMMARY OF INVENTION

Technical Problem

The objective of the present invention is to provide a method for differentiating destructive thyroiditis.

Solution to Problem

The present inventors have conducted diligent research to solve the above problem, and found that although monoiodotyrosine and diiodotyrosine were not known to be released outside the thyroid gland such as into the blood after the thyroid gland destruction, the amounts thereof in the blood are surprisingly higher in patients with destructive thyroiditis in comparison to in patients with thyroid diseases or abnormal thyroid function which are apart from destructive thyroiditis (hereinafter, both are together referred to as "non-destructive thyroiditis diseases"), e.g., in patients with TSH and FT4 levels within reference values or Graves' disease, and have completed the present invention.

In other words, the present invention is as follows:

[1]
A method for differentiating destructive thyroiditis, comprising measuring at least one of monoiodotyrosine and diiodotyrosine in a sample.

[2]
The differentiation method according to the above-mentioned item [1], wherein both monoiodotyrosine and diiodotyrosine are measured.

[3]
The differentiation method according to the above-mentioned item [1] or [2], wherein the sample is blood.

[4]
The differentiation method according to any one of the above-mentioned items [1] to [3], wherein the measurement of at least one of monoiodotyrosine and diiodotyrosine in the sample is performed using LC-MS using these stable isotopes as an internal standard substance.

[5]
A biomarker for differentiating destructive thyroiditis, which is either monoiodotyrosine or diiodotyrosine in a sample.

[6]
The biomarker according to the above-mentioned item [5], which is both monoiodotyrosine and diiodotyrosine.

[7]
The biomarker according to the above-mentioned item [5] or [6], wherein the sample is blood.

[8]
A kit for differentiating destructive thyroiditis, comprising a means for measuring at least one of monoiodotyrosine and diiodotyrosine in a sample collected from a subject, and a means for comparing the obtained measurement of the subject with at least one of the measurements of monoiodotyrosine and diiodotyrosine in corresponding samples collected from an unaffected body, a non-destructive thyroiditis disease-affected body and a destructive thyroiditis-affected body.

[9]
A kit for differentiating destructive thyroiditis, comprising a means for measuring at least one of monoiodotyrosine and diiodotyrosine in a sample collected from a subject, and a means for comparing the obtained measurement of the subject with a cutoff value of monoiodotyrosine and/or diiodotyrosine.

[10]
The kit for differentiation according to the above-mentioned item [8] or [9], wherein both monoiodotyrosine and diiodotyrosine are measured.

Advantageous Effects of Invention

The present invention allows differentiating destructive thyroiditis. In particular, destructive thyroiditis can be differentiated from non-destructive thyroiditis diseases, e.g., Graves' disease, Plummer's disease and gestational transient hyperthyroidism, among these, especially from Graves' disease.

BRIEF DESCRIPTION OF DRAWINGS

FIG. 1 shows the concentration of monoiodotyrosine (MIT) in the serum of patients with thyroid disease.

FIG. 2 shows the concentration of diiodotyrosine (DIT) in the serum of patients with thyroid disease.

FIG. 7 has combined the results of FIGS. 1 and 3 together in one figure.

FIG. 8 shows the results of FIG. 7 in quartiles (box-and-whisker diagram).

FIG. 9 has combined the results of FIGS. 2 and 5 together in one figure.

FIG. 10 shows the results of FIG. 9 in quartiles (box-and-whisker diagram).

DESCRIPTION OF EMBODIMENTS

Figure 3:
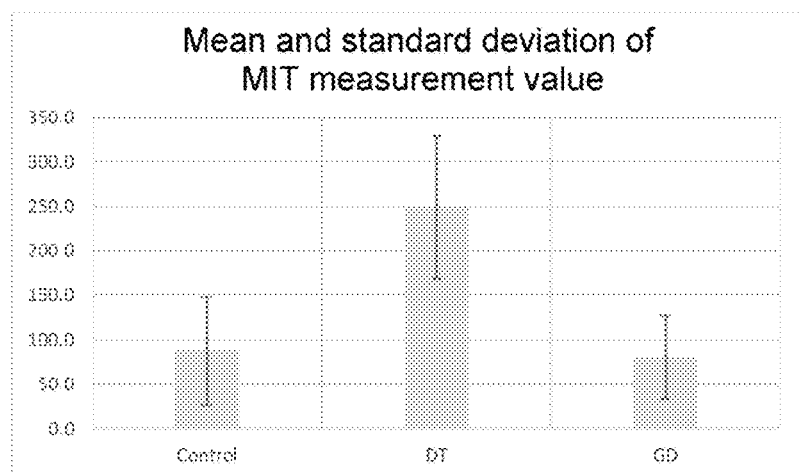
FIG. 3 shows the MIT concentration in the serum of patients with thyroid disease.
Figure 4:
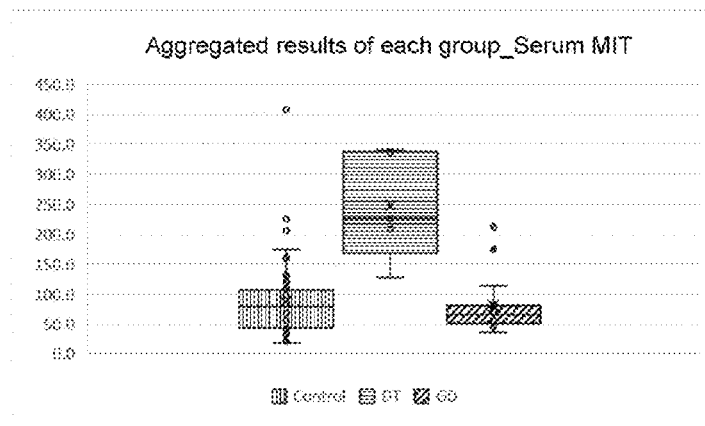
FIG. 4 shows the results of FIG. 3 in quartiles (box-and-whisker diagram).
Figure 5:
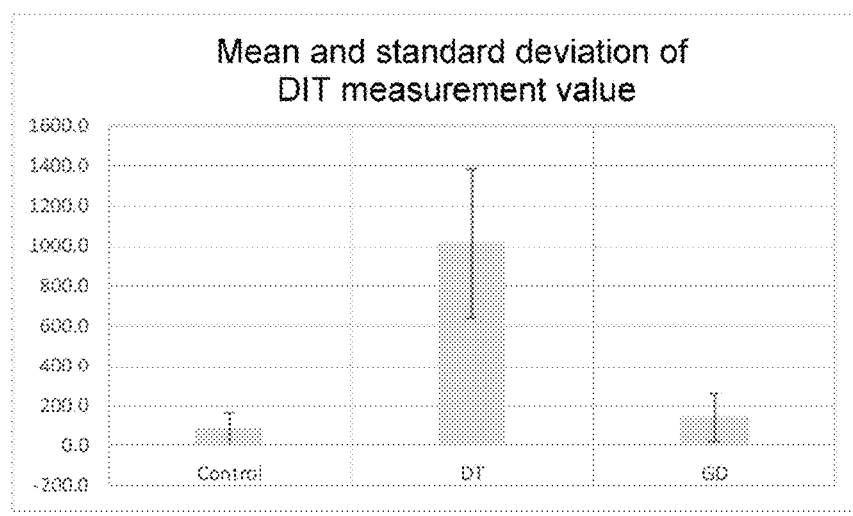
FIG. 5 shows the DIT concentration in the serum of patients with thyroid disease.
Figure 6:
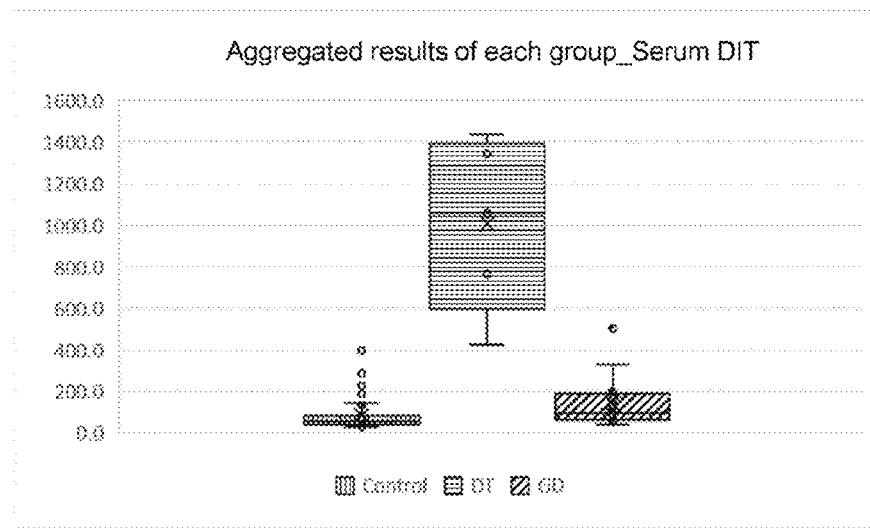
FIG. 6 shows the results of FIG. 5 in quartiles (box-and-whisker diagram).

In the present invention, as described above, "non-destructive thyroiditis disease" refers to thyroid diseases and thyroid function abnormalities, which are apart from destructive thyroiditis, and examples thereof include Graves' disease, Plummer's disease and gestational transient hyperthyroidism. Furthermore, "non-destructive thyroiditis disease" includes diseases for which levothyroxine (LT4) is administered for total thyroidectomy, diseases for which thyroid test values are abnormal but did not qualify as thyroid diseases, and diseases for which thyroid hormone and TSH levels are within normal ranges during treatment for thyrotoxicosis (hyperfunction) or hypofunction.

In the present invention, the amount of at least one of monoiodotyrosine and diiodotyrosine (hereinafter, collectively referred to as "the biomarkers of the present invention") of the samples collected from destructive thyroiditis-affected body, unaffected body and non-destructive thyroiditis disease-affected body is higher in the destructive thyroiditis-affected body than that of the unaffected body or non-destructive thyroiditis disease-affected body. Therefore, measuring the biomarkers of the present invention allows the differentiation of destructive thyroiditis, and in particular, the differentiation of destructive thyroiditis from non-destructive thyroiditis (especially, Graves' disease).

Specifically, for example, at least one of the biomarkers of the present invention of the samples collected from each of a subject, a unaffected body and a non-destructive thyroiditis disease-affected body which are to be differentiated is measured, and the obtained measurements of the subject can be compared with those of a unaffected body and a non-destructive thyroiditis disease-affected body to differentiate whether or not the subject is affected with destructive thyroiditis. For example, if the measurements of a subject are significantly higher than those of unaffected body and non-destructive thyroiditis disease-affected body based on statistical methods, the subject can be differentiated as suffering from destructive thyroiditis rather than non-destructive thyroiditis diseases.

Alternatively, destructive thyroiditis can be differentiated by setting cutoff values and comparing the obtained measurements of the subject with the cutoff values. The cutoff value means a value at which, if this value is exceeded by the MIT and/or DIT measurements in a sample of a subject, the subject is differentiated as suffering from destructive thyroiditis rather than non-destructive thyroiditis diseases.

Cutoff values vary by animal species and sample. For example, the cutoff value of MIT in human serum is preferably 250 pg/mL (e.g., 260 pg/mL), more preferably 210 pg/mL (e.g., 200 pg/mL), furthermore preferably 160 pg/mL, and especially preferably 120 pg/mL. For example, the cutoff value of DIT in human serum is 400 pg/mL, preferably 300 pg/mL (in particular, 350 pg/mL), more preferably 260 pg/mL, furthermore preferably 250 pg/mL, and especially preferably 200 pg/mL.

The cutoff value can be calculated based on the ROC (Receiver Operating Characteristic) curve, for example.

In the present invention, at least one of monoiodotyrosine and diiodotyrosine can be measured and compared for differentiation. However, diiodotyrosine is particularly preferably measured and compared. Furthermore, in the present invention, it is preferable to measure and compare both monoiodotyrosine and diiodotyrosine, as this increases the accuracy and precision of the differentiation.

In the differentiation method of the present invention, "subject" refers to animals including humans; "unaffected body" refers to animals including humans, which are not under treatment for thyroid diseases and thyroid function abnormalities such as thyrotoxicosis and hypothyroidism, and of which TSH and FT4 levels are within reference values; "non-destructive thyroiditis disease-affected body" refers to animals including humans, which have been diagnosed by a physician or veterinarian as suffering from non-destructive thyroiditis diseases; and "destructive thyroiditis-affected body" refers to animals including humans, which have been diagnosed by a physician or veterinarian as suffering from destructive thyroiditis.

The reference values of TSH and FT4 above should be values with no significant abnormality as compared to healthy individuals or healthy animals other than humans. The reference values vary depending on the animal species and samples, for example, the reference values in human serum of the above TSH are 0.61 to 4.68 μIU/mL and the reference values in human serum of the above FT4 are 0.76 to 1.65 ng/dL.

Examples of non-human animals include pet animals such as dogs, cats and parakeets; domestic animals such as cattle, pigs and horses; and poultry such as chickens.

In the differentiation of the present invention, when comparing the measurements of the subject, unaffected body, non-destructive thyroiditis disease-affected body and destructive thyroiditis-affected body, or comparing the measurements of the subject with cutoff values, these values are preferably measured at least in the same animal species. In addition, the subspecies (including human race), sex, age (including month old and week old), height and weight as well as the conditions of the sample are preferred to be identical.

The "sample" used in which MIT and DIT are measured in the present invention can be, without particular restriction, any sample collected from the subject, unaffected body, non-destructive thyroiditis disease-affected body and destructive thyroiditis-affected body, as long as the sample is derived from an organism and is not from the thyroid gland. Examples thereof include blood (whole blood, serum, plasma), saliva, tear fluid, sweat, urine, feces, bile, tissue, hair, or living cells, or preparations obtained from tissues, culture media of living cells, or organs (organs exclude thyroid glands, and tissue and cells exclude those from the thyroid gland). Preferably this is blood, saliva and urine, and more preferably blood, especially serum and plasma.

In the present invention, the method for measuring the biomarker of the present invention is not particularly restricted as long as the monoiodotyrosine and/or diiodotyrosine in the sample can be measured with the method, and conventional methods for measurement can be used.

For example, the following methods can be used: the conventional radioimmunoassay (RIA) method (elevated serum diiodotyrosine (DIT) in severe infections and sepsis: DIT, a possible new marker of leukocyte activity. Meinhold H, Gramm H J, Meissner W, Zimmermann J, Schwander J, Dennhardt R, Voigt K. J Clin Endocrinol Metab. 1991 April; 72(4):945-53) and LC-MS/MS methods (Effects of exogenous monoiodotyrosine on the serum levels of anterior pituitary hormones. Tan S A, Lewis J E, Berk L S, Wilcox R B. Acta Endocrinol (Copenh). 1991 March; 124(3):251-7). Other methods such as chemiluminescence enzyme immunoassay (CLEIA), enzyme-linked immunoassay (ELISA) and electrochemiluminescence immunoassay (ECLIA) can also be used.

Preferably, liquid chromatography mass spectrometry (LC-MS) that can be conveniently performed without the use of radioactive materials or derivatization processes and has a broad quantitative range that can use stable isotopes as internal standard substances (I.S.) is preferred.

LC-MS refers to an analysis method using an apparatus that combines liquid chromatography and mass spectrometry. Examples thereof include liquid chromatography tandem mass spectrometry (LC-MS/MS) and liquid chromatography time-of-flight mass spectrometry (LC-TOF-MS), with LC-MS/MS being preferred.

To perform mass spectrometry, it is necessary to ionize the component of interest. Ionization methods include such as atmospheric pressure chemical ionization (APCI), electrospray ionization (ESI) and atmospheric pressure photoionization (APPI). These ionization methods can be combined with LC-MS/MS to perform methods such as Liquid Chromatography-Electrospray ionization based Tandem Mass Spectrometry (LC-ESI/MS/MS) and Liquid Chromatography-Atmospheric pressure chemical ionization based Tandem Mass Spectrometry (LC-APCI/MS/MS). These measurements themselves can be performed by common methods. LC-ESI/MS/MS is preferred for the present measurement. There are two types of ion detection: positive ion detection and negative ion detection, of which negative ion detection is preferred for the present measurement.

The mass spectrometer parts include, for example, magnetic field type, quadrupole type, time-of-flight type, and the like. However, in the present invention, it is preferable to use a quadrupole type with good quantitative performance, wide dynamic range, and good linearity.

In addition, the following is included as for the detection of ions in quantitation: Selected Ion Monitoring in which only the ions of interest are selectively detected and Selected Reaction Monitoring (SRM) in which one of the ion species generated in the first mass spectrometer part is selected as a precursor ion, and then, in the second mass spectrometer part, the product ion generated by the cleavage of that precursor ion is detected. In the present invention, the SRM measurement is preferred as it improves the signal/noise ratio by increasing selectivity and decreasing noise.

Stable isotopes of monoiodotyrosine and diiodotyrosine are commercially available or can be synthesized by conventional methods.

The differentiation method of the present invention targets MIT and DIT for measurement, and thus, the above-mentioned negative ion detection LC-ESI/MS/MS assay method can be used, which is excellent in that it can conveniently and accurately differentiate destructive thyroiditis.

The present invention also relates to a method of the use of monoiodotyrosine or diiodotyrosine, or preferably both, as biomarkers for differentiating destructive thyroiditis, and in particular for differentiating destructive thyroiditis from non-destructive thyroiditis disease (in particular, Graves' disease).

The present invention also relates to a differentiation kit for the use in the differentiation method of the present invention.

The kit used for the differentiation method of the present invention may include at least one selected from buffer solution, acid, base, alcohol, syringe, antibody, and documentation describing the measurement procedure. In addition to these, the kit used for the differentiation method of the present invention may further include a document describing the determination criteria.

More specifically, the "kit for differentiation (differentiation kit)" of the present invention includes the means necessary to differentiate destructive thyroiditis by comparing at least one measurement of the biomarkers of the present invention in a sample collected from a subject with measurements or cutoff values of at least one biomarkers of the present invention in the corresponding samples collected from unaffected body, non-destructive thyroiditis disease-affected body, and destructive thyroid disease-affected body. For example, means for measuring at least one of the biomarkers of the present invention present in a sample collected from a subject includes sample collection and preparation tools, MIT and/or DIT measurement tools and reagents, such as column cartridges. Moreover, as means for comparing measurements of at least one of the biomarkers of the present invention in a sample collected from a subject with measurements or cutoff values of at least one of the biomarkers of the present invention in a corresponding sample collected from an unaffected body, a non-destructive thyroiditis disease-affected body, and a destructive thyroiditis-affected body, a comparison chart of measurements or cutoff values for each of the unaffected body, non-destructive thyroiditis disease-affected body and destructive thyroiditis-affected body can be included. Among them, the comparison chart is particularly useful because it makes it possible to differentiate diseases to be differentiated without depending on the judgment of a physician.

The present invention also relates to a method for screening a therapeutic or prophylactic agent of destructive thyroiditis comprising measuring at least one of monoiodotyrosine and diiodotyrosine, or preferably both, in a sample.

EXAMPLES

The following examples specifically illustrate the present invention, but the present invention is not limited to the following examples. The apparatus and materials used in the Examples are as follows.

[Example 1] Differentiation of Patients with Destructive Thyroiditis by LC-MS/MS Measurement (1)

1. Preparation of Samples Containing MIT and DIT

In a test tube, 0.05 mL of human serum and 0.05 mL of an internal standard (300 pg/0.05 mL of a mixed methanol solution of MIT-$^{13}C_6$ and DIT-$^{13}C_9^{15}N$) were added, and 0.1 mL of 25 mg/mL dithiothreitol/1% pyridine solution was added, stirred, and allowed to stand at room temperature for 30 minutes. After standing, 1 mL of purified water and 4 mL of methyl-tert-butyl ether were added to the test tube, shaken for 5 minutes, and centrifuged for 3 minutes to remove the methyl-tert-butyl ether. To the aqueous layer, 0.5 mL of acetic acid/acetonitrile (1:50) was added and centrifuged for 3 minutes. Then, the supernatant was transferred to another test tube and loaded onto HyperSep (registered trademark) CX-cartridge (Thermo Fisher) that was pre-conditioned with 3 ml of methanol, 1 mL of purified water, and 1 mL of 1% aqueous acetic acid solution. After washing with 1 mL of purified water and 3 mL of methanol, MIT and DIT were eluted with 1 mL of methanol/purified water/ammonia water (6:14:1), and then, the eluate was subjected to distillation with centrifugal evaporator, the remaining was dissolved in 0.1 mL of 20 mM aqueous ammonium formate, and a sample containing MIT and DIT were prepared.

2. LC-MS/MS Conditions

Samples prepared as described above were analyzed by LC-MS/MS. The LC-MS/MS conditions are shown in Table 1 below.

TABLE 1

| LC-MS/MS Analysis Conditions | |
|---|---|
| MS/MS | API-5000 |
| HPLC | |
| Autosampler | Agilent 1290 Infinity LC injector HTC |
| Pump | Agilent 1290 Infinity LC system |
| Column | CapcellPAK ADME (2 um, 2.1 × 100 mm) |
| Mobile phase | A:20 mM HCOONH4 |

TABLE 1-continued

LC-MS/MS Analysis Conditions

|  | B:MeOH |
|---|---|
|  | 0.0→0.01 A/B = 80:20 |
|  | 0.01→0.3 A/B = 80:20-70:30 |
|  | 0.3→1.0 A/B = 70:30-60:40 |
|  | 1.0→2.0 A/B = 60:40-20:80 |
|  | 2.0→2.5 A/B = 20:80-0:100 |
|  | 2.5→3.0 A/B = 0:100 |
| Column temperature | 50° C. |
| Flow rate (1$^{st}$) | 0.0→0.01:0.5-0.4 mL/min |
|  | 0.1→2.5:0.5 mL/min |
|  | 2.5→2.51:0.4-0.5 mL/min |
|  | 2.51→3.0:0.5-0.7 mL/min |
| Injection volume | 20 μL |
| Run Time | 3.0 min |
| MS/MS |  |
| Ionization method | ESI (Negative) |
| CAD | 10 psi |
| CUR | 20 psi |
| Gas 1 | 50 psi |
| Gas 2 | 80 psi |
| IonSpray Voltage | −4200 volts |
| Ion source temperature | 550° C. |

Subject for measurement/Internal standard substance

| | | | MS/MS Parameter | | | |
|---|---|---|---|---|---|---|
| | Q1 | Q3 | DP | EP | CE | CXP |
| MIT | 306.137 | 126.9 | −90 | −10 | −26 | −19 |
| DIT | 431.852 | 126.8 | −115 | −10 | −42 | −17 |
| MIT-13C6 | 312.000 | 126.9 | −90 | −10 | −26 | −19 |
| DIT-13C915N | 441.9 | 126.8 | −115 | −10 | −42 | −17 |

Measurement time range: 1.2-2.5 min
Resolution: Q1/Unit Q3/unit

3. Validation Results

The validation results of the LC-MS/MS analysis described above are shown in Table 2 below.

TABLE 2

| Validation items | MIT | DIT |
|---|---|---|
| Linearity (pg/mL) | 60~20000 | 60~20000 |
| Lower limit of quantification (pg/mL) | 60 | 60 |
| Analyte recovery rate (%) | 93.6~102.2 | 106.2~111.8 |
| Intra-day precision (%) | 3.2~7.1 | 3.3~4.5 |

TABLE 2-continued

| Validation items | MIT | DIT |
|---|---|---|
| Inter-day precision (%) | 4.8~5.6 | 6.2~7.5 |
| Freeze-thaw stability (%) | 105.0~107.0 | 90.9~114.5 |

As shown in Tables 1 and 2, the method for measuring MIT and DIT by LC-MS/MS of the present invention has a short measurement time of 3 minutes per sample, a lower limit of quantification of 60 pg/mL, and good validation results.

MIT and DIT in human serum from patients with thyroid disease were measured using the method for measuring MIT and DIT by LC-MS/MS of the present invention described above. Results are shown in Table 3 and FIGS. 1 and 2.

TABLE 3

| | MIT | | DIT | | |
|---|---|---|---|---|---|
| Group | Mean | Standard deviation | Mean | Standard deviation | N |
| Control | 120.8 | 104.1 | 92.5 | 100.8 | 48 |
| DT | 210.6 | 145.9 | 1062.1 | 598.4 | 5 |
| GD | 156.3 | 73.8 | 101.9 | 52.2 | 8 |
| GTH | 60.4 | — | 79.8 | — | 1 |

Control: Patients with physical and data abnormalities suspected for thyroid disease at the physician's examination and TSH and FT4 levels within reference values despite TSH/FT4 being measured.
DT: Patients diagnosed with destructive thyroiditis (DT) (1 subacute, 2 painless)
GD: Patients diagnosed with Graves' disease (GD)
GTH: Patients with gestational transient hyperthyroidism Table 3 and FIGS. 1 and 2 show that destructive thyroiditis can be differentiated by measuring MIT or DIT in blood. In particular, it was found that destructive thyroiditis can be differentiated from non-destructive thyroid diseases, especially from Graves' disease.

[Example 2] Differentiation of Patients with Destructive Thyroiditis by LC-MS/MS Measurement (2)

MIT and DIT in human serum from patients with thyroid disease were measured according to the methods described in Example 1. Results are shown in Table 4 and FIGS. 3 to 6.

TABLE 4

| | Serum MIT (pg/mL) | | | Serum DIT (pg/mL) | | | |
|---|---|---|---|---|---|---|---|
| Group | Mean | Standard deviation | Medium | Mean | Standard deviation | Medium | N |
| Control | 87.33 | 60.47 | 84.0 | 82.02951 | 82.63 | 51.4 | 61 |
| DT | 248.20 | 80.73 | 226.6 | 1007.52 | 373.37 | 1058.8 | 5 |
| GD | 79.84 | 47.10 | 65.3 | 139.575 | 119.03 | 94.3 | 16 |

Control: Patients with physical and data abnormalities suspected for thyroid disease at the physician's examination and with thyroids having TSH and FT4 levels within reference values despite TSH/FT4 being measured.
DT: Patients diagnosed with destructive thyroiditis (DT)
GD: Patients diagnosed with Graves' disease (GD)

Table 4 and FIGS. 3 to 6 show that destructive thyroiditis can be differentiated by measuring MIT or DIT in blood. In particular, it was found that destructive thyroiditis can be differentiated from Graves' disease.

[Example 3] Differentiation of Patients with Destructive Thyroiditis by LC-MS/MS Measurement (3)

The data were calculated by aggregating the results of Examples 1 and 2 into one. Results are shown in Table 5 and FIGS. 7 to 10.

TABLE 5

| | MIT (pg/mL) | | | DIT (pg/mL) | | | |
|---|---|---|---|---|---|---|---|
| Group | Mean | Standard deviation | Medium | Mean | Standard deviation | Medium | N |
| Control | 96.17 | 61.51 | 88.4 | 85.34 | 90.15 | 51.4 | 109 |
| DT | 229.40 | 119.38 | 202.5 | 1034.80 | 499.50 | 911.8 | 10 |
| GD | 99.79 | 61.53 | 74.9 | 132.72 | 105.73 | 101.6 | 24 |
| GTH | 60.40 | 0.00 | 60.4 | 79.80 | 0.00 | 79.8 | 1 |

Control: Patients with physical and data abnormalities suspected for thyroid disease at the physician's examination and with thyroids having TSH and FT4 levels within reference values despite TSH/FT4 being measured.
DT: Patients diagnosed with destructive thyroiditis (DT)
GD: Patients diagnosed with Graves' disease (GD)
GTH: Patients with gestational transient hyperthyroidism Table 5 and FIGS. 7 to 10 show the aggregated results of Examples 1 and 2 into one. Here, the number of examples has increased and the accuracy is found to be higher.

Table 5 and FIGS. 7 to 10 show that destructive thyroiditis can be differentiated by measuring MIT or DIT in blood. In particular, it was found that destructive thyroiditis can be differentiated from non-destructive thyroid diseases, especially from Graves' disease.

[Example 4] Measurement of DIT by Chemiluminescence Enzyme Immunoassay (CLEIA)

1. Preparation of Plates and Solutions

The 96-well plate with immobilized anti-mouse IgG rabbit antibody was prepared as follows. Anti-mouse IgG rabbit antibody solution (Jackson Immunoresearch Laboratories Ltd.) was diluted in phosphate-buffered saline to a concentration of 10 µg/mL, and 100 µL of the solution was dispensed into (each well of) a 96-well white plate (Thermo Fisher Scientific Inc.). The reaction was then carried out at 4° C. for 16 hours, washed twice with 0.02% Triton (registered trademark) X-100, and then washed twice with 5% sucrose for preparation. Alkaline phosphatase-labeled DIT solution was prepared as follows. 100 nmol of DIT was labeled with alkaline phosphatase using Alkaline Phosphatase Labelling Kit-NH2 (Dojindo Laboratories) to make an alkaline phosphatase-labeled DIT stock solution. Assay buffer (0.1 mol/L Tris-hydrochloric acid buffer pH 7.5 containing 2 mmol/L magnesium chloride, 20 µmol/L zinc chloride, 0.1% bovine serum albumin, and 0.1% sodium azide) was used to dilute alkaline phosphatase labeled DIT stock solution to 5000-fold for preparation. Anti-DIT mouse antibody solution was prepared by diluting anti-dibromotyrosine monoclonal antibody (Japan Institute for the Control of Aging (JaICA), Nikken SEIL Co., Ltd.) to a concentration of 100 ng/mL with the assay buffer. 0.5 mmol/L phenacyl phosphate solution was prepared by dissolving phenacyl phosphate to a concentration of 0.5 mmol/L in an enzyme reaction buffer (50 mmol/L 2-monoethanolamine hydrochloric acid buffer pH 9.5 containing 0.002% Triton (registered trademark) X-100). 0.001% lucigenin solution was prepared by dissolving lucigenin into lucigenin diluted solution (0.2 mol/L potassium dihydrogen phosphate solution) to a concentration of 0.001%.

2. Creation of Standard Curve for DIT

100 µL of DIT standard solution was dispensed into (each well) of a 96-well plate with immobilized anti-mouse IgG rabbit antibody. Then, 25 µL of alkaline phosphatase labeled DIT solution and 25 µL of anti-DIT mouse antibody solution were added, mixed, and allowed to react at 10° C. for 2 hours. After washing 4 times with washing buffer containing 0.02% Triton (registered trademark) X-100 and 0.1% sodium azide, 100 µL of 0.5 mmol/L phenacyl phosphate solution was dispensed and allowed to react for 2 hours at room temperature, and then, 50 µL of 0.001% lucigenin solution was dispensed, mixed, and placed in bioluminescence/chemiluminescence measurement device (ATTO Cooperation). 150 µL of 1.0 mol/L sodium hydroxide solution was dispensed in the bioluminescence/chemiluminescence measurement device, and the luminescence intensity from 8 to 9 seconds after dispensing was integrated.

3. Results of DIT Standard Curve

Figure 11:
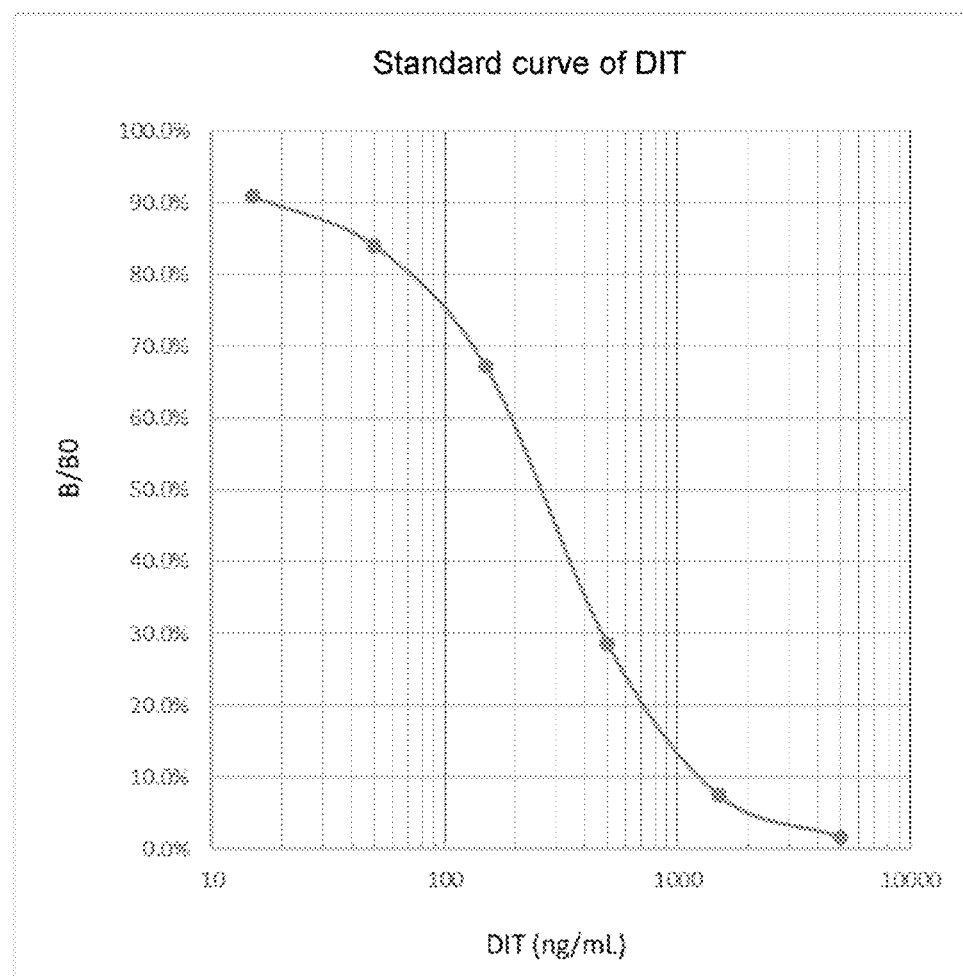
FIG. 11 shows the standard curve of DIT.

The DIT standard curve results are shown below in Table 6 and FIG. 11. A good standard curve was generated and it was found possible to measure DIT by the CLEIA method.

TABLE 6

| DIT(ng/mL) | Luminescence intensity | B/Bo |
|---|---|---|
| 0 | 8.81E+06 | 100.0% |
| 15 | 8.01E+06 | 90.9% |
| 50 | 7.41E+06 | 84.0% |
| 150 | 5.93E+06 | 67.3% |
| 500 | 2.52E+06 | 28.6% |
| 1500 | 6.62E+05 | 7.5% |
| 5000 | 1.52E+05 | 1.7% |

$B/B_0$ = Luminescence intensity at each concentration/Luminescence intensity at 0 concentration

INDUSTRIAL APPLICABILITY

According to the differentiation method of the present invention, destructive thyroiditis can be differentiated by measuring at least one of monoiodotyrosine (MIT) and diiodotyrosine (DIT) in a sample. In particular, this can differentiate between destructive thyroiditis and Graves' disease, which was therapeutically necessary. Moreover, monoiodotyrosine (MIT) and diiodotyrosine (DIT) can also be used as biomarkers for the diagnosis or differentiation of destructive thyroiditis.

The present invention can be used, for example, in the fields of medicine and pharmacy.

The invention claimed is:

1. A method for measuring monoiodotyrosine and/or diiodotyrosine in a subject, comprising:
   collecting a test sample from the subject, wherein the test sample is not from the thyroid gland of the subject; and
   obtaining a first test measurement of monoiodotyrosine, a second test measurement of diiodotyrosine, or the first test measurement and the second test measurement in the test sample, wherein the first test measurement is higher than a first control measurement of monoiodotyrosine in a first corresponding sample collected from a first unaffected body or a first non-destructive thyroiditis disease-affected body or higher than a first cutoff value, and wherein the second test measurement is higher than a second control measurement of diiodotyrosine in a second corresponding sample collected from a second unaffected body or a second non-destructive thyroiditis disease-affected body or higher than a second cutoff value.

2. The method according to claim 1, wherein the first test measurement and the second test measurement are obtained.

3. The method according to claim 1, wherein the test sample is blood.

4. The method according to claim 1, wherein the first test measurement is obtained by using liquid chromatography mass spectrometry (LC-MS) and a stable isotopes of monoiodotyrosine as an internal standard substance.

5. The method according to claim 1, wherein the second test measurement is obtained by using liquid chromatography mass spectrometry (LC-MS) and a stable isotope of diiodotyrosine as an internal standard substance.

6. The method according to claim 2, wherein the first test measurement is higher than the first control measurement and the second test measurement is higher than the second control measurement.

7. The method according to claim 1, wherein the first test measurement is obtained, and wherein the first test measurement is higher than the first control measurement.

8. The method according to claim 1, wherein the second test measurement is obtained, and wherein the second test measurement is higher than the second control measurement.

9. The method according to claim 1, wherein the subject suffers from destructive thyroiditis.

10. The method of claim 1, wherein the subject suffers from symptoms of thyrotoxicosis in which destructive thyroiditis results.

11. The method of claim 1, wherein the non-destructive thyroiditis disease is selected from the group consisting of thyroid diseases and thyroid function abnormalities, which are apart from destructive thyroiditis.

12. The method of claim 1, wherein the non-destructive thyroiditis disease is selected from the group consisting of Graves' disease, Plummer's disease and gestational transient hyperthyroidism.

13. The method of claim 1, wherein the non-destructive thyroiditis disease is Graves' disease.

14. The method according to claim 1, wherein the first test measurement is obtained, the method further comprising obtaining the first control measurement.

15. The method according to claim 1, wherein the second measurement is obtained, the method further comprising obtaining the second control measurement.

16. The method of claim 2, further comprising obtaining the first control measurement and the second control measurement.

* * * * *